Aug. 4, 1964

F. E. BOOKER 3,143,295

AGRICULTURAL SPRAY APPARATUS

Filed June 21, 1960

INVENTOR.
FINIS E. BOOKER

BY John J. McLaughlin

ATTORNEY

Aug. 4, 1964    F. E. BOOKER    3,143,295
AGRICULTURAL SPRAY APPARATUS
Filed June 21, 1960    5 Sheets-Sheet 3
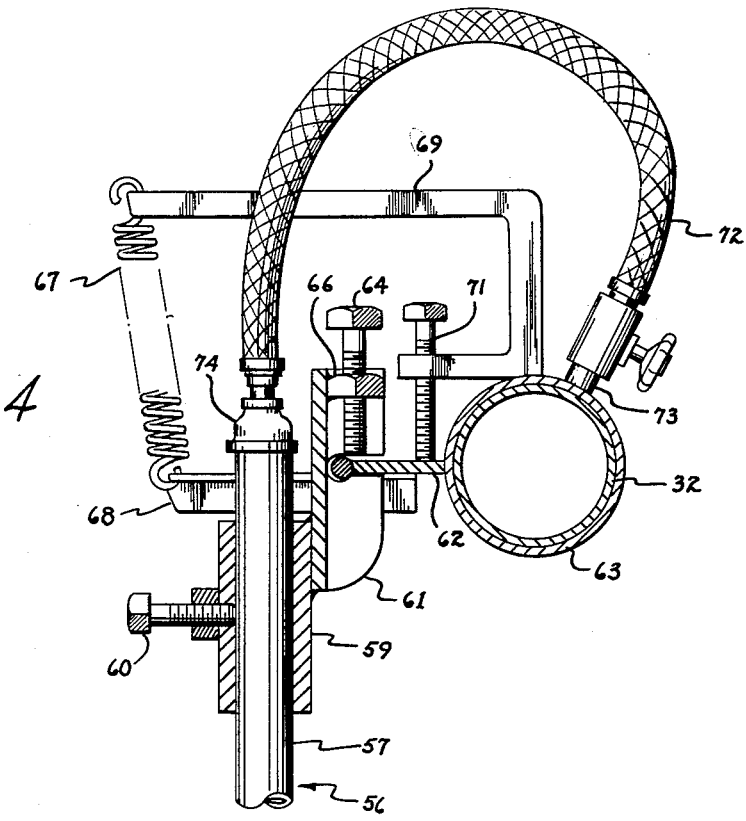
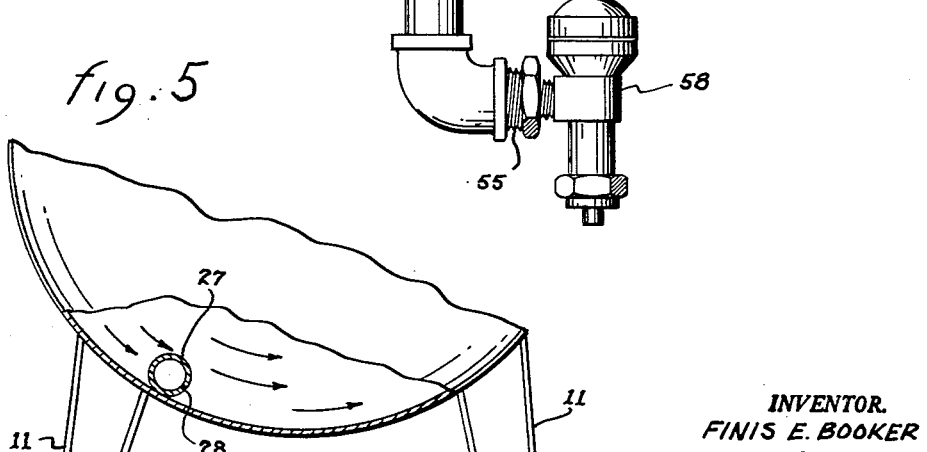
INVENTOR.
FINIS E. BOOKER
BY
John J. McLaughlin
ATTORNEY Aug. 4, 1964
F. E. BOOKER
3,143,295
AGRICULTURAL SPRAY APPARATUS
Filed June 21, 1960
5 Sheets-Sheet 4
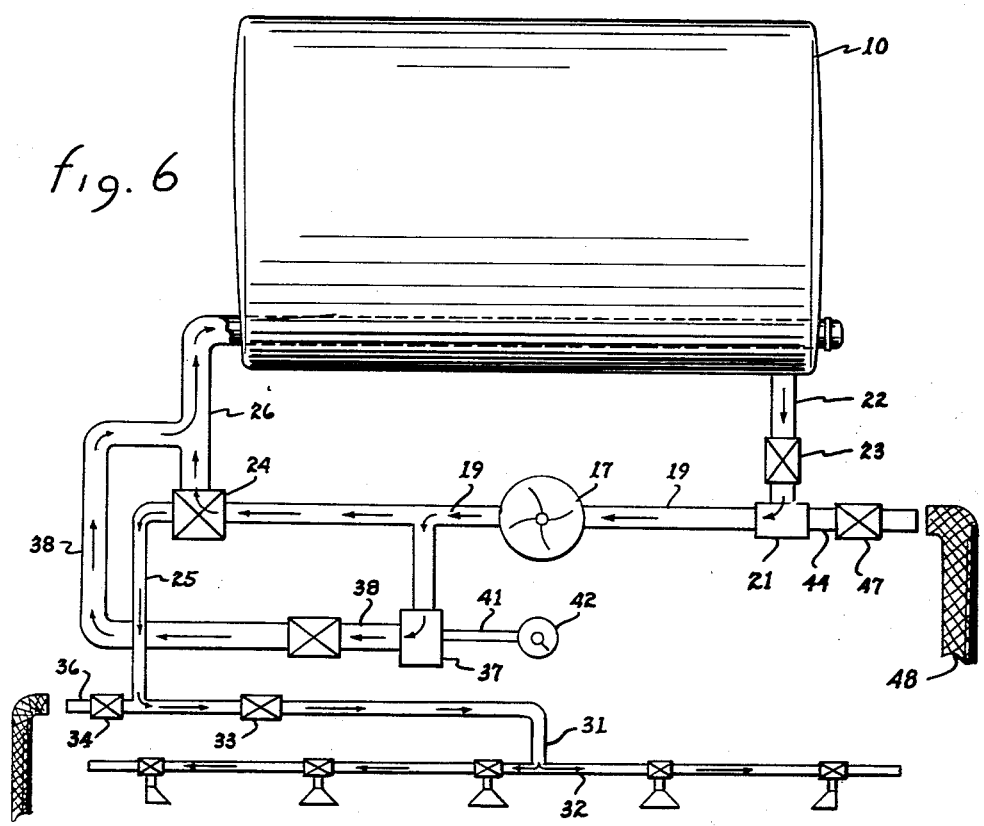
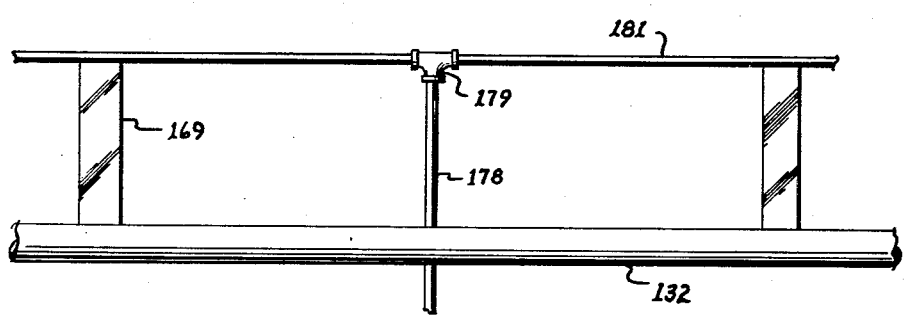
INVENTOR.
FINIS E. BOOKER
BY John J. McLaughlin
ATTORNEY Aug. 4, 1964  F. E. BOOKER  3,143,295
AGRICULTURAL SPRAY APPARATUS
Filed June 21, 1960  5 Sheets-Sheet 5
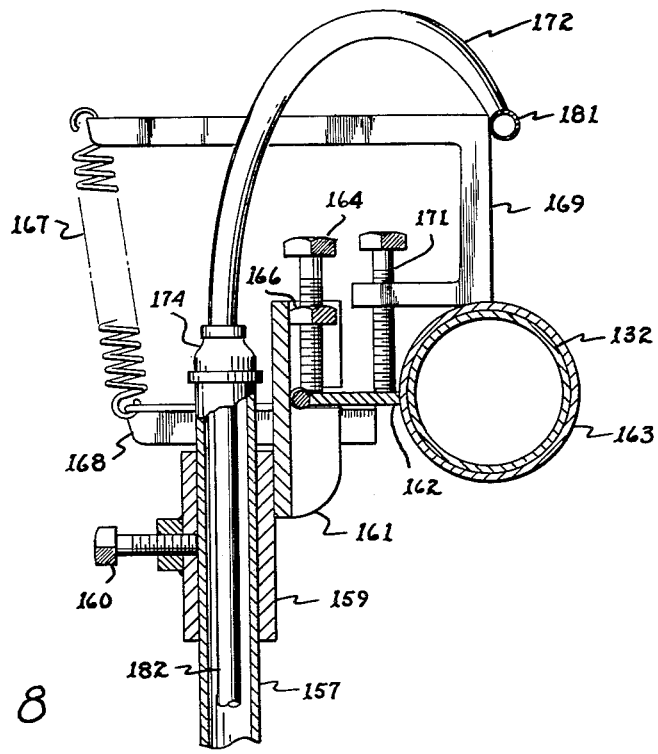
fig. 8
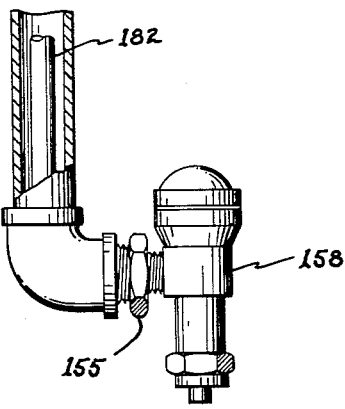
INVENTOR.
FINIS E. BOOKER
BY
John J. McLaughlin
ATTORNEY

United States Patent Office 3,143,295
Patented Aug. 4, 1964

3,143,295
AGRICULTURAL SPRAY APPARATUS
Finis E. Booker, P.O. Box 162, Eloy, Ariz.
Filed June 21, 1960, Ser. No. 37,753
4 Claims. (Cl. 239—142)

My invention relates generally to an improved spray method for spraying growing agricultural products and apparatus for use in the practice of the method.

The spraying of growing plants is a very old art, and with the passage of time the number of chemical products available for spray treatment of plants has greatly increased, and with such increase has developed a requirement for precision control of spraying operations. To meet the requirements for precision control of newly developed chemical compositions, there have been many improvements in spray equipment utilized at the ground level as well as improvements in aircraft spraying techniques. Notwithstanding the developments of recent years, there are still many operations in which the most successful use has not been made of new chemicals or the costs involved make the operation economically unsound.

One illustrative example is the control of weeds in cotton fields. To a considerable extent, the use of chemical weed killers in cotton fields has not been effective. As an example, Du Pont has made available a product known commonly as "Karmax" which initially seemed to offer considerable promise of effectiveness. This product may be suspended in water but does not dissolve in water. To be effective and also safe it must be applied under complete control, both as to uniformity of percentage of the chemical deposited and as to its distribution on the ground. Within my knowledge products of this type have not been satisfactorily used because of limitations of existing methods and availability of satisfactory equipment.

The principal object of my invention is, therefore, to improve methods and apparatus for ground level spraying operations.

Another object is the provision of improved spray apparatus having particular advantages in the uniform and accurate application of highly technically effective chemicals such as weed killers, but also having general utilization in applying any type of spray treatment to row crops.

Still another object of my invention is the provision of spray equipment which may be operated entirely by one man and the application of highly sensitive chemicals still effectively and safely controlled.

A further object of my invention is the provision of spray equipment of the type identified which is relatively inexpensive to produce, operate and service, and which may be serviced with tools, equipment and parts commonly found in a farming area.

Other specific objects and features of my invention will be apparent from the following detailed description taken with the accompanying drawings, wherein:

FIG. 4 is an enlarged elevational view partly in section and partly broken away showing one of the individual spray assemblies;

FIG. 5 is a fragmentary elevational view of one end of the tank with parts broken away to illustrate construction;

Figure 1:
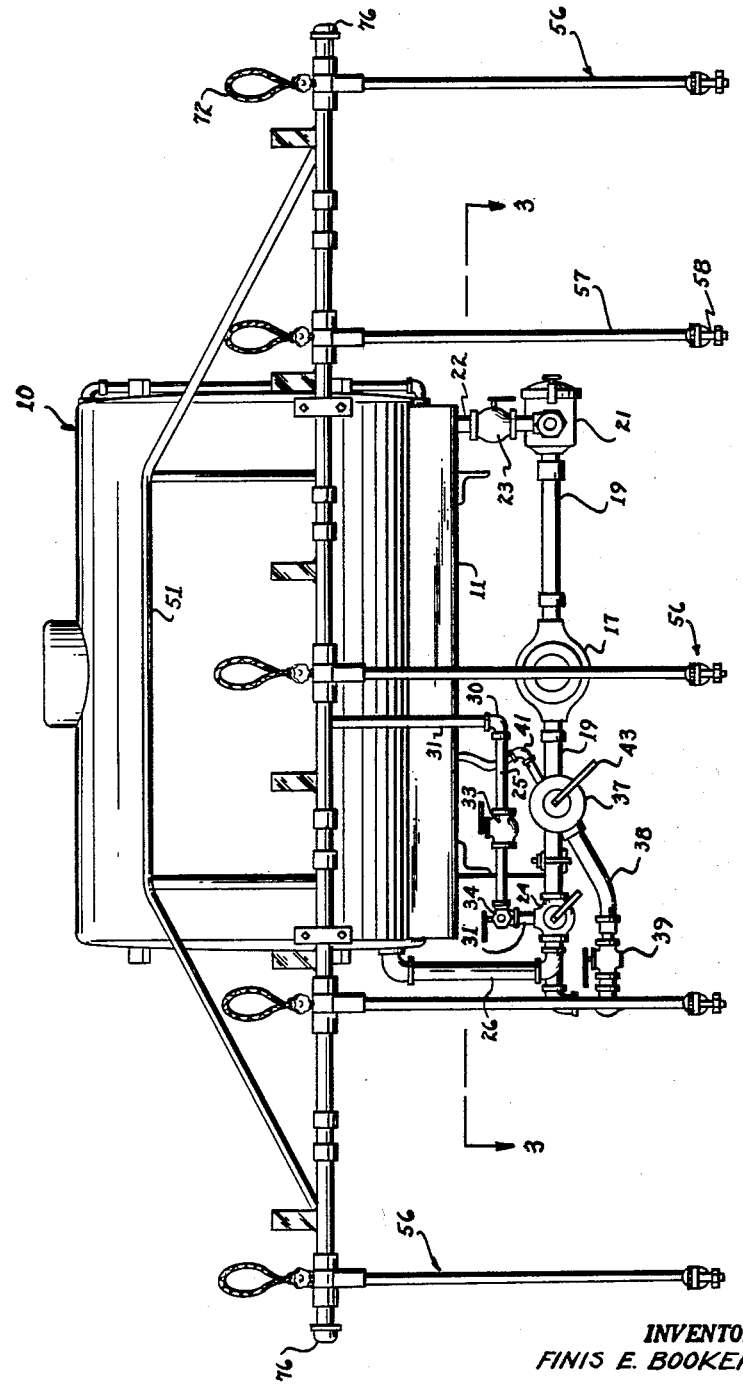
FIG. 1 is a rear elevational view showing a preferred embodiment of my invention.

FIG. 6 is a schematic view showing the manner in which liquid is circulated through the tank and to the spray apparatus; and, FIGS. 7 and 8 are fragmentary elevational views, partly in section, showing a modified feed line system to the spray nozzles, which modification is of particular importance when the chemical sprayed is insoluble, and as disperse phase in a liquid suspension settles out relatively rapidly.

In carrying out my invention, I provide a relatively small mixing tank as part of the apparatus which can be secured to and suspended completely from the rear of a tractor, and utilize the standard power take off from such tractor, both to continuously circulate the liquid in the spray tank and keep it uniformly mixed and to force a controlled amount of the mixed liquid to a spray boom for accurate application to growing plants. The relatively small tank, for example with a maximum capacity of 150 gallons, is readily filled from any available water supply such as water in an irrigation ditch. By adding the spray chemical to the tank in unit packages as the tank is being filled, very accurate control of the spraying solution is possible with only relatively unskilled help.

Referring now to the drawings, I provide unitary apparatus adapted for attachment to and complete suspension from a tractor, said device including a tank 10 carried on skids 11 welded to frame members 12 for attachment to a tractor axle by bolts 13 which extend through a vertical portion of frame 12 and through an anchor plate 14. A plurality of supporting legs 16 are releasably attached to the two ends of tank 10 so that the unit apparatus may be quickly removed from the tractor and supported on the legs 16 and such legs removed after reattachment to the tractor.

Figure 2:
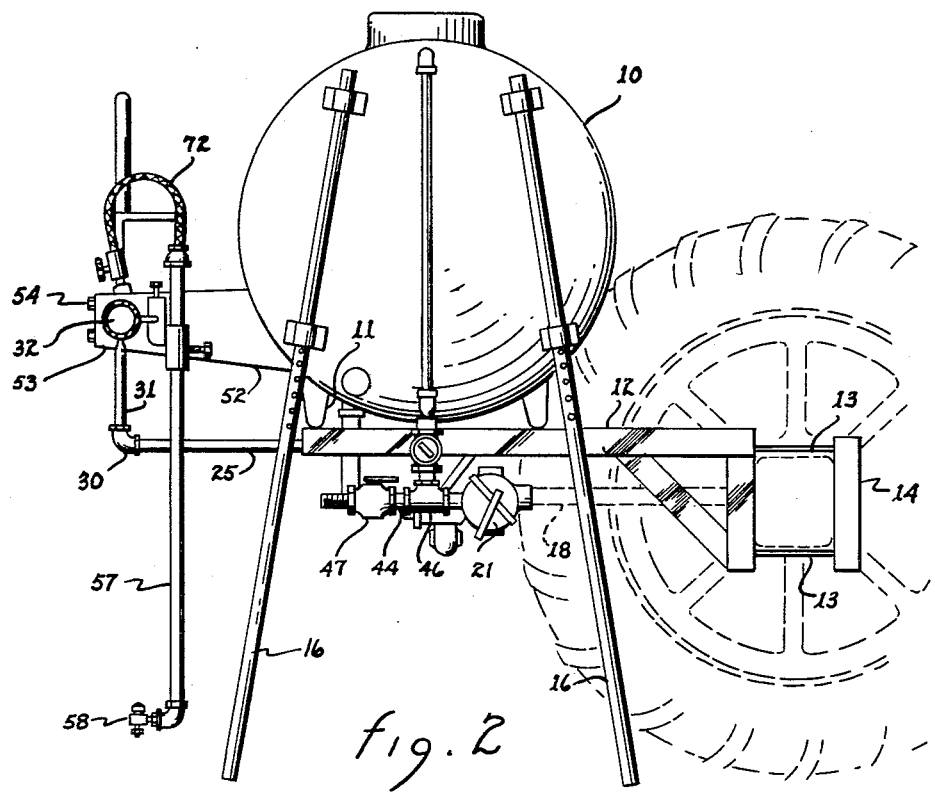
FIG. 2 is a side elevational view indicating the manner in which the equipment may be attached to a tractor, and the manner in which it is supported when not carried by the tractor.
Figure 3:
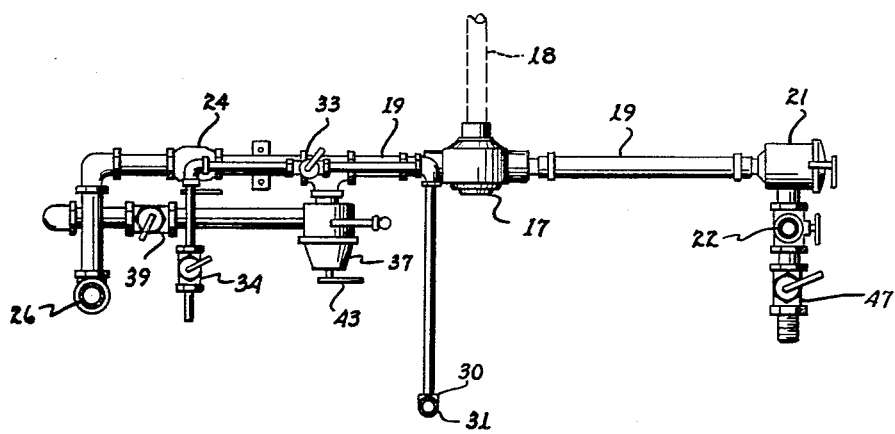
FIG. 3 is a planned sectional view taken on the line 3—3 of FIG. 1.

For maintaining continuous circulation and mixing within the tank 10, I provide a pump 17 having its shaft connected directly to a power take off 18 from the tractor. While various types of pumps may be utilized, I prefer a high capacity rotary pump and have obtained very good results with the Hypro 1500 Roller Impeller Pump. I have found that this pump not only provides adequately high capacity, and is a readily available commercial product, but also that it can operate for a very long period of time without excessive wear which would normally be caused by particles suspended in the water, most of which have considerable abrasion action. Any good rotating pump providing sufficient capacity and freedom from excessive wear may however be employed. The pump 17 is inserted in a line 19 which may be an ordinary 1½" iron pipe. The line 19 is connected through a strainer 21 to an upright pipe 22 leading to the bottom of the tank 10, a suitable shut off valve 23 being placed in the upright pipe 22 as desired. Any suitable commercially available strainer or filter may be used at 21 which has adequate capacity and will readily pass the tank liquid but will retain accidentally introduced foreign bodies. I have found the Beam filter No. 7395 very satisfactory. At its opposite end, the line 19 is connected through a three-way valve 24 to an upright pipe 26 which feeds into a pipe 27 (see FIG. 2) placed on the inside annular surface of the tank 10 but offset slightly from the bottom as shown in FIG. 5. A plurality of holes 28 in the pipe 27 are placed to deliver jets of water against the bottom surface of the tank 10 so as to have a scrubbing action and to maintain the entire tank contents in a state of turbulence, so that such tank contents will always be uniformally mixed. I have obtained very good results by forming the pipe 27 of ordinary iron pipe 1¼" diameter, and making the holes 28 ³⁄₁₆" in diameter and placing them three inches apart.

The three-way valve 24 is adapted to deliver liquid from the pump 17 through line 19 to the tank 10 through mixing pipe 27, or it can be adjusted to deliver such liquid to a horizontal line 25 connected by an elbow 30 to an upright pipe 31 leading to a transverse pipe 32 comprising part of a spray boom for delivery to spray nozzles as will be described. A valve 33 in the line 31 is adapted however to be closed and a valve 34 opened for delivering liquid to a pipe 36 for hand spraying. When liquid is delivered through the relatively small line 31 hydraulic line pressure is generated, and this causes a pressure control diaphragm type valve 37 to open and deliver liquid to bypass line 38 which in turn delivers the liquid back through the return circulating line 26 to the mixing pipe 27. A valve 39 in the bypass line 38 may be used to control flow of liquid through bypass line 38. A take-off 41 leads to a hydraulic pressure gauge 42 (see FIG. 6) placed near the driver's seat so that at all times the functioning of the pressure and bypass control valve 37 may be observed. By means of a suitable handle 43, the pressure control valve 37 may be adjusted to build up the pressure in the system and increase the amount of liquid delivered to the spray nozzles and decrease the amount of circulating liquid bypassing through the bypass line 38. An intake line 44 connects to a fitting 46 connected to the strainer 21. By opening valve 47 in the line 44 and closing the valve 23 in the line 22 running to the bottom of the tank, feed water may be drawn into the system by merely attaching a hose 48 (FIG. 6) and dropping its open end into water in an irrigation ditch at the edge of a field.

The spray boom comprising the transverse distribution pipe 32 has an overhead support 51. A pair of supports 52 secured by welding to the rear of the tank 10 cooperate with caps 53 held by cap screws 54 to grip the pipe 32 and thus hold the entire boom of which the pipe 32 forms a part. The individual spray assemblies indicated generally by the reference character 56 are carried in adjustable relation on the boom as shown in FIG. 4. Individual vertical tubes 57 carrying rotatably adjustable spray heads 58 on adapter 55 are adjustably slideably supported cylindrical guides 59 secured by welding to brackets 61. Bolts 60 hold the tubes 57 in adjusted position. The brackets 61 are horizontally adjustably supported on a horizontal plate 62 welded to a pair of rings 63 loosely fitting over pipe 32 by means of fastening bolts 64 threaded through nuts 66 welded to the brackets 61. The brackets 61 and their associated parts forming the spray assembly 56 thus hold a selected position on the horizontal plate 62. Tension positioning springs 67 have one end secure to arms 68 welded to brackets 61 and the other end secured to generally U shaped stationary arms 69 welded to pipe 32, so that the positioning springs 67 normally tend to rotate the entire assembly around the axis of the pipe 32 in a clockwise direction looking at FIG. 4 except as such movement is limited by set screws 71. By this arrangement the spray assemblies 56 are normally held in substantially vertical position but are permitted to ride out of the way if they should meet an obstruction while the equipment is being moved in a forward direction and promptly return to normal operating position when the obstruction has been passed. To deliver liquid from pipe 32 to the vertical tubes 57, flexible hoses 72 are provided with one end connected to a nipple 73 leading into the interior of pipe 32 and the other end connected to reducing couplings 74.

It should be noted that while the spray assemblies are bodily adjustable vertically and horizontally, and the spray heads adjustable rotatably with respect to the tubes 57 and their supporting adapters 55, the entire spray assembly rotates to retract the spray heads when an obstruction is encountered. This rigid but still adjustable spray assembly meets all of the requirements of positioning the spray nozzles, but absolutely fixes the positions of the spray nozzles, thus avoiding accidental spraying of dangerous or sensitive chemicals in places where they may cause plant damage. This rigidity with adjustability is secured with a minimum of weight so that the entire apparatus including spray boom, while rigid, may still be completely suspended from the rear of an ordinary tractor. This construction may be compared to those employing relatively flexible safety links in the spray assemblies, such as sections of rubber hose, which because of their lack of rigidity often permit dangerously powerful chemicals to be sprayed over plants in such a way as to cause damage.

Since the apparatus of my invention has utility in the precision spraying of water insoluble but water dispersible chemicals, there is a possibility of such chemical settling to the bottom of transverse pipe 32 after the apparatus has been standing several days. I, therefore, provide readily removable caps 76 at the ends of the pipe 32 so that one or both of such caps 76 may be removed to facilitate cleaning out such pipe. If the apparatus has been standing only a few hours or overnight, the pipes in the spray boom may be cleaned out by merely running water for a short time through the system.

In FIGS. 7 and 8 I illustrate a modification which may be used to advantage when the chemical being sprayed is water suspensible but not fully water soluble. In this modification, a reducing elbow 177 leads from pipe 125 to a small tube 178 leading to a T 179 connected to a cross tube 181 welded or brazed to the stationary arms 169 on the spray boom. A vertical tube 182 within each vertical tube 157 leads through the reducing coupling 174 and is connected at its bottom with the spray nozzle 158. A flexible rubber tube 172 is connected at one end by means of a T to the cross tube 181 and at its other end to the projecting top end of vertical tube 182. Removing portions of the assembly may be the same as in the first described embodiment, and such parts employ the same reference characters as in the first described embodiment, with, however, the prefix 1 to indicate modification.

While the diameter of pipes 178, 181 and 182 may vary, I have obtained good results using one-quarter inch copper tubing, as contrasted with the use of a one to one and one-half inch pipe for the cross pipe 32. Using quarter inch or even smaller diameter tubing throughout, the interior of such tubing is kept free of sediment. This relatively small tubing will still supply adequate volume of spray liquid to the nozzles which optionally have a spray opening of about one-thirty second inch. Notwithstanding the use of the small tubing, this modified construction provides all of the desirable features of rigidity and adjustability of the first described embodiment.

The general manner of operating the apparatus of my present invention should be understood from the foregoing description. In this connection I have illustratively referred to the application of an insoluble weed killer chemical to cotton. I have found that the use of five spray assemblies is very satisfactory in actual practice, but the boom may be extended in length and a larger number of spray assemblies applied as desired. When using the specific apparatus shown, I have used a flat spray nozzle of the type identified as TeeJet, manufactured and sold by Spraying Systems Co., of Bellwood, Illinois. Using this or any other similar type nozzle, the outside nozzles are selected to cover an arc of 75° or 80° and each of the three inside nozzles an arc of 130°–150°. The three inside nozzles, therefore, will cover all of the area between two rows of cotton plants, but each of the outside nozzles will cover only half this width. When the apparatus is moved the length of a field and then turned, the remaining untreated one-half row width will be covered by the outside nozzle, always leaving a half row width on the outside away from the area already covered.

Using a 150 gallon mixing tank, six pounds of "Karmax" in dry form are introduced into the tank as it is being filled from a suitable source, such as an irrigation ditch at the edge of the field. Preferably the required amount of chemical is packaged in a number of individual containers, so that by merely dumping the entire contents of a bag into an empty tank, the required proportions will result. The hose 48 is used to fill the tank, as described, by closing valve 23 and opening valve 47, the pump 17 being operated to draw the water through the hose 48 and through strainer 21 and thence through the recirculating system and into the tank 10.

Operating at 750 r.p.m., the Hypro 1500 pump will deliver 75 gallons of liquid per minute at 60 pounds pressure. The tank, therefore, will be filled in two minutes actual pumping time. As the water is introduced into tank 10, it is jetted out through the openings 28 in the mixing pipe 27 so that by the time all of the water has been introduced, the added chemical and water are thoroughly mixed and the mixture ready for application. By closing valve 47 and opening valve 23, constant recirculation of the water in the tank 10 is brought about, and this circulation also occurs at the rate of 75 gallons per minute. Bringing the apparatus in proper position at the beginning of a row or where the operator has left off, the valve 24 is turned to deliver liquid through the pipe 31 and into the spray nozzle as the tractor is moved forwardly between the rows at a definite predetermined speed. Using normal spraying, the pressure shown by valve 42 will drop from about 60 to about 50 pounds, about 10 to 15 gallons of liquid per minute will be delivered as a spray, so that about 60 to 65 gallons of liquid will continue to be recirculated and at all times the liquid in the tank will be vigorously agitated and remain in condition for proper spraying.

Using the equipment as described, I have found very satisfactory and uniform results are obtained in treating cotton fields for the eradication of weeds without injuring the cotton. The weed killer is applied uniformly to the ground just at or immediately below the surface of the ground, so that young weeds with their shallow roots will be killed but the cotton with its deeper roots will not be killed, particularly since none of the liquid will actually be sprayed on to the cotton plants themselves. In this connection it may be noted that cotton rows are normally placed 38 to 40 inches apart, and the spray assemblies are positioned along the spray boom to correspond with the distance between the rows.

The nozzles and the remaining parts of the equipment are readily selected and adjusted for many types of spraying operations, including the application of insecticides to the cotton plants themselves. In actual operation I have found approximately a 50% savings in spraying operations taking into consideration man power, capital investment and other costs. This saving does not include any reserve for losses resulting from damage to cotton plants. Because I am able more accurately to control spraying operations, there are no instances of damage to the crops themselves so that there is also an actual savings from this standpoint.

I have disclosed and described specific details of parts, arrangement and construction so that those skilled in the art may understand the manner of practicing my invention, but the details of the invention may be modified within the scope of the claims.

I claim:

1. In unit spray apparatus, a supply tank, a horizontal distribution pipe supported at the rear of the supply tank, a plurality of assemblies, each assembly comprising a ring rotatably carried by the distribution pipe, a horizontal plate fixed on said ring, a bracket horizontally adjustably supported on said ring, a vertical spray supply pipe carried by said bracket with a spray head on the bottom end and a flexible hose connection to the distribution pipe at the upper end, and spring means imparting rotatory movement to each individual assembly to bias each such assembly to a substantially vertical position, each said assembly adapted to rotate against its said spring bias when a ground obstruction is encountered.

2. Apparatus as defined in claim 1 wherein said supply pipe is vertically adjustable in the respective bracket.

3. Apparatus as defined in claim 1 including a relatively small pipe disposed within the said supply pipe and connected to a spray head, a relatively small transverse pipe fixed with respect to said distribution pipe, connections between said small transverse pipe and said small pipe in the vertical supply pipe, and means for delivering spray liquid to said small transverse pipe.

4. A unit apparatus for spraying a dispersion of solid material in an aqueous liquid, said apparatus including a relatively small supply tank, means for releasably attaching said tank to the rear of a tractor, a spray boom supported at the rear of the tank, said spray boom including a transverse distribution pipe, an agitator pipe within the tank spaced relatively close to the annular inside surface of the tank but displaced slightly from the bottom of such tank, said agitator pipe having jet holes along its length directed tangentially toward the bottom of the tank, liquid circulating means for continuously drawing liquid from the bottom of the tank and returning the same to said agitator pipe at sufficient speed to cause continuous scrubbing action and rapid agitation of the tank contents, means for delivering liquid from the tank to said distribution pipe, a plurality of spray heads carried below said spray boom and means for delivering liquid from the distributor pipe to said spray heads, said spray heads being carried on rigid pipes rotatably mounted on said distribution pipe and individually spring pressed to a stop holding them normally in vertical position, but adapted to swing against the action of the said spring to clear an obstruction when the apparatus is moving forwardly, and including a flexibile connection between the said vertical rigid pipes and said distribution pipe for supplying spray liquid to said pipes and spray heads carried thereby.

References Cited in the file of this patent
UNITED STATES PATENTS

| | | |
|---|---|---|
| 2,462,034 | Zeck | Feb. 15, 1949 |
| 2,584,484 | McIntosh | Feb. 5, 1952 |